(12) United States Patent
Tsuchiya et al.

(10) Patent No.: US 8,789,233 B2
(45) Date of Patent: Jul. 29, 2014

(54) CLEANING ELEMENT AND CLEANING TOOL

(75) Inventors: Akemi Tsuchiya, Kanonji (JP); Yoshinori Tanaka, Kagawa (JP)

(73) Assignee: Uni-Charm Corporation, Ehime (JP)

( * ) Notice: Subject to any disclaimer, the term of this patent is extended or adjusted under 35 U.S.C. 154(b) by 505 days.

(21) Appl. No.: 12/302,547

(22) PCT Filed: May 30, 2007

(86) PCT No.: PCT/JP2007/061028
§ 371 (c)(1),
(2), (4) Date: Jan. 16, 2009

(87) PCT Pub. No.: WO2007/139166
PCT Pub. Date: Dec. 6, 2007

(65) Prior Publication Data
US 2010/0229317 A1    Sep. 16, 2010

(30) Foreign Application Priority Data
May 31, 2006  (JP) .................................. 2006-152749

(51) Int. Cl.
*A47L 13/20* (2006.01)
*A47L 13/256* (2006.01)

(52) U.S. Cl.
USPC .......................................... 15/229.3; 15/226

(58) Field of Classification Search
USPC ............. 15/118, 223, 226, 228, 229.1–229.9, 15/147.1, 147.2
See application file for complete search history.

(56) References Cited

U.S. PATENT DOCUMENTS

| | | | |
|---|---|---|---|
| 823,725 A * | 6/1906 | Hayden ........................... | 15/114 |
| 6,047,435 A | 4/2000 | Suzuki et al. | |
| 6,813,801 B2 | 11/2004 | Tanaka et al. | |
| 7,779,502 B2 * | 8/2010 | Fujiwara et al. ............. | 15/229.4 |
| 2002/0148061 A1 * | 10/2002 | Tanaka et al. ................ | 15/229.3 |
| 2004/0016074 A1 | 1/2004 | Tanaka | |
| 2006/0051434 A1 | 3/2006 | Tsuchiya | |

FOREIGN PATENT DOCUMENTS

| | | |
|---|---|---|
| CN | 1386059 A | 12/2002 |
| JP | 09-154791 A | 6/1997 |
| JP | 0003103720 | 6/2004 |
| JP | 2005-169148 | 6/2005 |
| JP | 2006-102471 A | 4/2006 |
| WO | WO 02/03847 | 1/2002 |
| WO | WO 02/03847 A2 | 1/2002 |

OTHER PUBLICATIONS

Office Action from corresponding Chinese Application No. 200780019551.0 dated Aug. 10, 2010, 11 pgs.
European Search Report from corresponding European Application No. 07744439.6 dated Apr. 10, 2014 (6 pgs).

* cited by examiner

*Primary Examiner* — Robert Scruggs
(74) *Attorney, Agent, or Firm* — Brinks Gilson & Lione

(57) ABSTRACT

It is an object of the invention to provide an effective technique for realizing a higher cleaning effect in a cleaning tool having a sheet-type cleaning element for wiping an object to be cleaned. According to a representative cleaning element, the sheet pieces (11*f*) of a cleaning side sheet (111*c*) have a smaller width in a longitudinal direction than the sheet pieces (111*d*) of an upper face side sheet (111*a*).

5 Claims, 9 Drawing Sheets

|  | Sample1 | Sample2 | Sample3 | Comparison1 | Comparison2 |
|---|---|---|---|---|---|
| ※1 [mm] | 4 | 5 | 7 | 3 | 10 |
| ※2 [mm] | 68 | 70 | 72 | — | 79 |

※1 Width of the strips

※2 Bending resistances

FIG. 11

|  | Sample1 | Sample2 | Sample3 | Comparison1 | Comparison2 |
|---|---|---|---|---|---|
| ※1 [mm] | 4 | 5 | 7 | 3 | 10 |
| ※2 | 34 | 33 | 27 | — | 18 |
| ※3 [%] | 100 | 100 | 80 | — | 50 |
| ※4 | ◎ | ◎ | ○ | × | △ |
| ※5 | ○ | ○ | ○ | × | ○ |
| ※6 | ◎ | ◎ | ◎ | ○ | ○ |

※1　Width of the strips

※2　Tight-space conformability of the strips

※3　Tight-space conformability of the fiber bundle

※4　Volume of the cleaning element

※5　Productivity of strips

※6　Irregular-face dust collecting capability

CLEANING ELEMENT AND CLEANING TOOL

CROSS-REFERENCE TO PRIOR APPLICATION

This is the U.S. National Phase Application under 35 U.S.C. §371 of International Patent Application No. PCT/JP2007/061028 filed May 30, 2007, which claims the benefit of Japanese Patent Application No. 2006-152749 filed May 31, 2006, both of which are incorporated by reference herein. The International Application was published in Japanese on Dec. 6, 2007 as WO2007/139166a1 under pct article 21(2).

BACKGROUND OF THE INVENTION

1. Field of the Invention

The present invention relates to a cleaning tool, and more particularly to a cleaning tool having a cleaning element for cleaning a face to be cleaned inside a room or a vehicle.

2. Description of the Related Art

Conventionally, various types of cleaning tools having a sheet-type cleaning element for wiping an object to be cleaned have been provided. For example, Japanese non-examined overlaid-open Patent Publication No. 9-154791 discloses a cleaning tool having cleaning fabric and a holder that detachably holds the cleaning fabric inserted into a holding space of the cleaning fabric. This cleaning tool is capable to wipe a face to be cleaned by using the cleaning fabric held via the holder. However, in designing a cleaning element or a cleaning tool of this type having the cleaning element, it is required to provide a technique for realizing a higher cleaning effect with a cleaning tool having a sheet-type cleaning element for wiping an object to be cleaned.

SUMMARY OF THE INVENTION

Accordingly, it is an object of the present invention to provide an effective technique for realizing a higher cleaning effect in a cleaning tool having a sheet-type cleaning element for wiping an object to be cleaned.

The above-described problem can be solved by the features of claimed invention. This invention can be applied to faces to be cleaned (floors, walls, ceilings, external walls, furniture, clothes, curtains, bedding, home electric appliances, etc.) inside and outside of houses, apartments, buildings, factories, vehicles, etc. These faces to be cleaned may be either flat or curved, uneven or stepped.

The cleaning element according to this invention includes at least a fiber bundle, an upper face side sheet and a cleaning side sheet.

According to the invention, the fiber bundle comprises a plurality of fibers and extends in a predetermined longitudinal direction. Preferably, the fiber bundle may have a planar structure having a predetermined flat or curved surface and has a three-dimensional form having a certain thickness or has a thin sheet-like form. The "fibers" in this invention are elements of yarn, textile or the like and defined as being thin and flexible fibers having a substantially longer length compared with the thickness. Typically, a long continuous fiber is defined as a filament and a short fiber as a staple. Further, the "fiber bundle" in this invention is a single fiber structure formed by the above-mentioned fibers, a fiber structure having the above-mentioned fibers aligned in the length direction and/or the radial direction (twist yarn, spun yarn, yarn to which a plurality of filaments are partially connected), or an assembly of the fiber structures. Typically, the fiber bundle is formed of polyethylene (PE), polypropylene (PP), polyethylene terephthalate (PET), nylon, rayon or the like. In practical use, an assembly of filaments formed by opening a tow is frequently used as the fiber bundle.

In this invention, an upper face side sheet is overlaid on an upper face of the fiber bundle, and a cleaning side sheet is overlaid on a lower face of the fiber bundle. In this case, the fiber bundle is sandwiched between the upper face side sheet and the cleaning side sheet. Further, the cleaning side sheet faces an object to be cleaned and is positioned between the fiber bundle and the face of the object to be cleaned during a cleaning operation. The upper face side sheet and the cleaning side sheet are formed of sheet-like nonwoven fabric and joined together in the laminated state on the fiber bundle at a joining portion that extends in the longitudinal direction. Both of the sheets have a plurality of sheet pieces extending parallel in a direction crossing the longitudinal direction. The "nonwoven fabric" in this invention has a sheet-like configuration formed by fixing or entangling fibers by mechanical, chemical or heat treatment. Typically, the nonwoven fabric partly includes thermal melting fibers (thermoplastic fibers) and thus can be fusion bonded. The sheet pieces of the upper face side sheet and the cleaning side sheet are typically formed into a zigzag, linear or curved shape.

Further, in this invention, the sheet pieces of the cleaning side sheet and the fibers of the fiber bundle extend elongate in the direction crossing the longitudinal direction, having a fixed end only at the joining portion and free ends on the sides opposite to the joining portion. Specifically, the sheet pieces of the cleaning side sheet and the fibers of the fiber bundle extend without another joining portion being provided between the fixed end and the free end.

In the cleaning element in which the cleaning side sheet is joined to the lower face of the fiber bundle, the cleaning side sheet is positioned between the fiber bundle and the face of the object to be cleaned. Therefore, even if the cleaning side sheet has a plurality of sheet pieces, the sheet pieces may impair the essential dust trapping capability of the fiber bundle.

Therefore, in this invention, the sheet pieces of the cleaning side sheet have a smaller width in the longitudinal direction than the sheet pieces of the upper face side sheet. With such structure, the sheet pieces of the upper face side sheet have relatively high rigidity, while the sheet pieces of the cleaning side sheet have relatively low rigidity. The upper face side sheet pieces having relatively high rigidity has a function of maintaining the wiping function of the cleaning element. The cleaning side sheet pieces having relatively low rigidity allow the fiber bundle to be easily exposed from the cleaning side sheet to the cleaning side. Thus, the surface exposed area of the fiber bundle is increased, and the dust trapping capability of the fiber bundle can be enhanced. Therefore, with such structure of the cleaning element according to this invention, the cleaning effect can be enhanced without impairing the essential dust trapping capability of the fiber bundle.

It is essential for the cleaning element in this invention to have a structure in which the upper face side sheet is overlaid on the upper face of the fiber bundle and the cleaning side sheet is overlaid on the lower face of the fiber bundle. The fiber bundle, the upper face side sheet and the cleaning side sheet comprise a single sheet or a plurality of sheets overlaid one on another. The upper face side sheet may comprise one or more upper face side sheets having sheet pieces and overlaid on the upper face of the fiber bundle. For example, if a plurality of upper face side sheets are overlaid on the upper face of the fiber bundle, each of the upper face side sheets can be functionally assigned, for example, as a base sheet or a holding sheet. With this structure, the sheet pieces of at least one of the upper face side sheets can be used as the object to be compared in order to define the width of the sheet pieces of the cleaning side sheet.

Further, in the cleaning element according to this invention, the sheet pieces of the cleaning side sheet have a width of 4 to 7 mm in the longitudinal direction. Thus, the sheet pieces of the upper face side sheets have a width exceeding 7 mm in the longitudinal direction of the fiber bundle. With such structure, the cleaning element can obtain a higher cleaning function by optimizing the width of the sheet pieces of the cleaning side sheet in the longitudinal direction of the fiber bundle.

Further, in the cleaning element according to this invention, the sheet pieces of the cleaning side sheet may have lower rigidity than the sheet pieces of the upper face side sheet. With such structure, the upper face side sheet pieces having relatively high rigidity has a function of maintaining the wiping function of the cleaning side sheet. The cleaning side sheet pieces having relatively low rigidity allow the fiber bundle to be easily exposed from the cleaning side sheet to the cleaning side. Thus, the surface exposed area of the fiber bundle is increased, and the dust trapping capability of the fiber bundle can be enhanced. Therefore, with such structure of the cleaning element according to this invention, the cleaning effect can be enhanced without impairing the essential dust trapping capability of the fiber bundle. Further, in this invention, the upper face side sheet may comprise one or more upper face side sheets having sheet pieces and overlaid on the upper face of the fiber bundle. With this structure, the sheet pieces of at least one of the upper face side sheets can be used as the object to be compared in order to define the rigidity of the sheet pieces of the cleaning side sheet.

Further, in the cleaning element according to this invention, the fiber bundle has crimped fibers, and at least part of the crimped fibers are entangled with the sheet pieces of the cleaning side sheet and swing together with the sheet pieces around the joining portion toward the object to be cleaned. The "crimped fibers" here are fibers subjected to a predetermined crimping process and easily entangled with each other. This structure can be realized especially by using crimped fibers opened from a tow. With this structure, when the user lightly shakes or breaks up the cleaning element into pieces by hand such that air is taken into the fiber bundle, the fibers of the fiber bundle is easily entangled with the sheet pieces of the cleaning side sheet, and the fiber bundle becomes bulkier than before the holder is mounted thereto. Thus, the cleaning element having a higher cleaning effect can be provided.

A cleaning tool according to this invention includes at least the above-described cleaning element and a holder. The holder in this invention has a grip to be held by a user in a cleaning operation and a holding portion for holding the cleaning element, and the grip and the holding portion are coupled to each other. The holder is detachably mounted to the cleaning element. In the holder mounted state, the holding portion of the holder holds the cleaning element. A user holds the grip of the holder to perform a cleaning operation. Typically, in the cleaning element, the upper face side sheet overlaid on the upper face of the fiber bundle includes a mounting portion for mounting the holder holding portion. The holder holding portion is mounted to the mounting portion. The user can replace the cleaning element by removing the cleaning element from the holding portion of the holder as necessary. With such structure, a cleaning tool with a cleaning element having a higher cleaning effect can be provided.

The cleaning element mounted to the holder according to this invention may be of disposable type designed for single use, disposable type designed for multiple use which can be used several times, while retaining dust which has been removed from the face to be cleaned, on a brush portion, or reusable type which can be reused by washing.

Further, in the cleaning tool according to this invention, the fibers of the fiber bundle depend downward around the joining portion together with the sheet pieces of the cleaning side sheet, whereby the fiber bundle becomes bulkier than before the holder is mounted. With such structure, when the user holds the grip of the holder by hand and lightly shakes the holder, the fibers of the fiber bundle depend downward around the joining portion together with the sheet pieces of the cleaning side sheet. As a result, the fiber bundle contains air and thus becomes bulkier. At this time, in the cleaning tool of this invention, in which the sheet pieces of the cleaning side sheet have a relatively small width, the volume of the fiber bundle can be increased without causing a problem that the sheet pieces of the cleaning side sheet impair elasticity of the fiber bundle. Thus, the user can gain higher expectations and peace of mind with respect to the dust trapping function.

As described above, according to this invention, in a cleaning tool having a sheet-type cleaning element for wiping an object to be cleaned, particularly, the sheet pieces of the cleaning side sheet have a smaller width in the longitudinal direction of the fiber bundle than the sheet pieces of the upper face side sheet, whereby a cleaning effect can be improved.

BRIEF DESCRIPTION OF THE DRAWINGS

FIG. 11 is a table showing the results of evaluations of various properties of each test sample.

DETAILED DESCRIPTION OF THE INVENTION

A representative embodiment of the present invention will now be described with reference to the drawings. First, the structure of a cleaning tool 100 according to this embodiment will now be explained with reference to FIGS. 1 to 5. Objects to be cleaned with the cleaning tool 100 includes faces to be cleaned (floors, walls, windows, ceilings, external walls, furniture, clothes, curtains, bedding, lighting, home electric appliances, etc.) inside and outside of houses, apartments, buildings, factories, vehicles, etc. and faces of human body parts to be cleaned. These faces to be cleaned may be either flat or curved, uneven or stepped.

Figure 1:
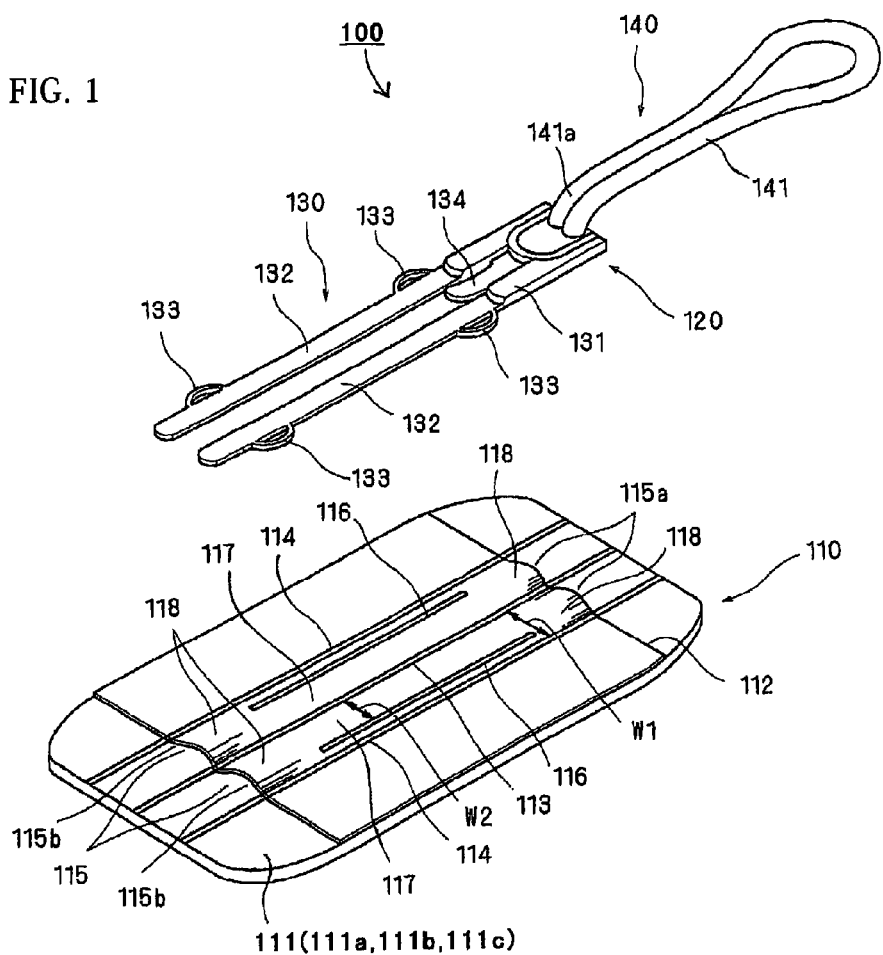
FIG. 1 is a perspective view showing a cleaning tool 100 according to an embodiment of the present invention, in a disassembled state into a cleaning element 110 and a cleaning element holder 120.

FIG. 1 shows the cleaning tool 100 according to this embodiment in perspective view, in a disassembled state into a cleaning element 110 and a cleaning element holder 120. As shown, the cleaning tool 100 comprises the cleaning element 110 and the cleaning element holder 120.

The cleaning element 110 includes a cleaning element body 111 and a holding sheet 112 overlaid on and joined to the upper face of the cleaning element body 111. The cleaning element 110 comprises a sheet-type cleaning element having a function of removing dirt on the face to be cleaned. As shown in FIG. 1, the cleaning element 110 is rectangular in plan view and elongate in a predetermined longitudinal direction (the direction of the length).

The cleaning element body 111 forming the cleaning element 110 includes a base sheet 111a, a fiber bundle 111b and a cleaning side sheet 111c laminated and joined together, which will be described in more detail below. All of the base sheet 111a, the fiber bundle 111b and the cleaning side sheet 111c are of sheet type, similarly rectangular in plan view and elongate in the longitudinal direction of the cleaning element 110 (hereinafter referred to as the "longitudinal direction"). The fiber bundle 111b and the cleaning side sheet 111c form a brush-like part having a dirt removing function, which is also referred to as the "brush portion"). The cleaning element 110 may be of disposable type designed for single use, disposable type designed for multiple use which can be used several times, while retaining dust which has been removed from the face to be cleaned, on the brush portion, or reusable type which can be reused by washing. Further, in this embodiment, the cleaning element body 111 of the cleaning element 110 has been described as a three-layer structure having the base sheet 111a, the fiber bundle 111b and the cleaning side sheet 111c, but may be constructed as a multilayer structure having an additional fiber layer and/or sheet.

The cleaning element body 111 and the holding sheet 112 are fusion bonded together at a central fusion-bonding line 113 and a pair of side mounting lines 114. The central fusion-bonding line 113 extends in the center of the cleaning element 110 in its longitudinal direction and the side mounting lines 114 extend parallel to the central fusion-bonding line 113 with a spacing W1 on its opposite sides of the central fusion-bonding line 113. Thus, holding spaces 115 extending in the longitudinal direction are defined between the central fusion-bonding line 113 and the side mounting lines 114. Each of the holding spaces 115 has a rear open end 115a and a front open end 115b. A holding plate 132 of a holder body 130 which will be described below can be inserted into the holding space 115. Further, the cleaning element body 111 and the holding sheet 112 are fusion bonded at narrowing fusion-bonding lines 116 provided between the central fusion-bonding line 113 and the side mounting lines 114. Thus, each of the holding spaces 115 has a narrow portion 117 having a width W2 (<W1) in the central region in the longitudinal direction and a wide portion 118 having a width W1 forward and rearward of the narrow portion 117. The spacing between the central fusion-bonding line 113 and the side mounting lines 114 may be constant or varied in the longitudinal direction. Further, the side mounting lines 114 and the narrowing fusion-bonding lines 116 may be spaced apart from or formed adjust to each other in a direction crossing the longitudinal direction.

The base sheet 111a, the cleaning side sheet 111c and the holding sheet 112 can typically be formed of sheet-type nonwoven fabric comprising thermal melting fibers (thermoplastic fibers) and thus referred to as nonwoven fabric sheet. The "nonwoven fabric" herein has a sheet-like configuration formed by fixing or entangling fibers by mechanical, chemical or heat treatment. The nonwoven fabric partly includes thermoplastic fibers and thus can be fusion bonded. Further, the nonwoven fabric has a plurality of strips. Examples of the thermal melting fibers (thermoplastic fibers) include polyethylene, polypropylene and polyethylene terephthalate. The nonwoven fabric may be formed by through-air bonding, spun bonding, thermal bonding, spun lacing, point bonding, melt blowing, stitch bonding, chemical bonding, needle punching or other similar processes. In order to enhance the dust wiping function, it is preferred to use a nonwoven fabric having higher rigidity. Moreover, a material to be worked into strips, such as urethane, sponge, a woven fabric, a net and a split cloth, may be used instead of or in addition to the nonwoven fabric.

The fiber bundle 111b is a single fiber structure formed by fibers, a fiber structure having fibers aligned in the length direction and/or the radial direction (twist yarn, spun yarn, yarn to which a plurality of filaments are partially connected), or an assembly of the fiber structures. The fiber bundle 111b partially includes thermoplastic fibers and can be fusion bonded. The fibers forming the fiber bundle 111b are elements of yarn, textile or the like and defined as being thin and flexible fibers having a substantially longer length compared with the thickness. Typically, a long continuous fiber is defined as a filament and a short fiber as a staple. The proximal ends of the fibers of the fiber bundle 111b are joined at the joining portions of the central fusion-bonding line 113 and the side mounting lines 114. The fibers of the fiber bundle 111b are fixed only at the joining portions and the opposite sides (distal ends) of the fibers are free. The fibers of the fiber bundle 111b extend elongate in a direction crossing the longitudinal direction of the cleaning element 110 (or the fiber bundle 111b). The fiber bundle 111b is a feature that corresponds to the "fiber bundle comprising a plurality of fibers" according to this embodiment.

In the representative example shown in FIG. 1, the fiber bundle 111b comprises three fiber layers, but it may comprise one or more fibers as necessary. Preferably, the fiber bundle 111b has a planar structure having a predetermined flat or curved face and has a three-dimensional form having a certain thickness or has a thin sheet-like form. The "fiber bundle" is typically formed of polyethylene (PE), polypropylene (PP), polyethylene terephthalate (PET), nylon, rayon or the like. In practical use, an assembly of filaments formed by opening a tow is frequently used as the fiber bundle. It is particularly preferable that the fiber bundle comprises conjugated fibers having a core of polypropylene (PP) or polyethylene (PE) and a core covering sheath of polyethylene (PE). Further, the filaments of the fiber bundle are preferred to have a fineness of 1 to 50 dtex, more preferably 2 to 10 dtex. The individual fiber bundle may contain fibers of generally the same fineness or of different finenesses.

Further, in order to enhance the dust wiping function, it is preferred to use fibers having higher rigidity or a fiber bundle including fibers having higher fineness. It is further preferred that the fiber bundle has crimped fibers. Here, the crimped fibers are fibers subjected to a predetermined crimping process and easily entangled with each other. With the fibers being crimped, the fiber bundle becomes bulkier than before the holder is mounted thereto, and dust can be easily captured by the crimped portions. This structure can be realized especially by using crimped fibers opened from a tow.

For the fiber bundle, flat yarns or split yarns may also be employed. The flat yarns are prepared by slitting a film into tapes and by stretching the tapes in the longitudinal direction. The split yarns are prepared by splitting a thermoplastic film resin in the direction perpendicular to the orientation direction of the resin so that the film is fibrillated and interconnected into a net shape. Alternatively, a nonwoven fabric which is bulky and has low fiber density, such as a through-air bonded nonwoven fabric, may be employed to form the fiber bundle.

The kinds and numbers of the component parts of the cleaning element 110 are not limited to those described in the above-described example, and can be selected as necessary. The cleaning element 110 is rectangular in plan view and is mounted onto the cleaning element holder 120 such that its longer side extends along the longitudinal direction of the holder body 130 and a handle 140 of the holder 120.

As shown in FIG. 1, the cleaning element 110 having the above-described structure is detachably mounted onto the cleaning element holder 120. The cleaning element holder 120 includes the holder body 130 and the handle 140 connected to each other. The cleaning element holder 120 is a feature that corresponds to the "holder" according to this invention. The handle 140 includes a longitudinally extending handle body 141 and a joint 141a disposed between the handle body 141 and the holder body 130. The handle body 141 is held by a user and is a feature that corresponds to the "grip" in this invention. The handle body 141 and the holder body 130 are fixedly connect at the joint 141a.

In this embodiment, the holder body 130 and the handle 140 (the handle body 141 and the connection 141a) are separately molded of resin material and thereafter assembled together. With this construction, the entire cleaning tool can be reduced in weight and the manufacturing costs can be reduced. Instead of this construction, the holder body 130 and the handle 140 (the handle body 141 and the connection 141a) may be integrally molded, or two of the holder body 130, the handle body 141 and the connection 141a may be integrally molded, or all of them may be separately molded and then fixed together.

The holder body 130 has a function of detachably holding the cleaning element 110 and is a feature that corresponds to the "holding portion" in this invention. The holder body 130 includes a base 131 on the handle 140 side, a pair of holding plates 132 and a retaining plate 134. The holding plates 132 extend forward in the longitudinal direction from the base 131 and parallel with a predetermined spacing therebetween. In other words, the holder body 130 has a bifurcated form. Each of the holding plates 132 may have a constant width in the longitudinal direction or be tapered. Further, two projections 133 are formed on the front and rear portions of the outer edge of the holding plate 132. Each of the projections 133 projects outward from the holding plates 132 and has a semi-circular projecting surface. The retaining plate 134 extends forward between the pair holding plates 132 and is convexly curved. The retaining plate 134 further has an engagement lug (not shown) on the underside.

The holding plate 132 can be inserted into the associated holding space 115 and has a function of holding the cleaning element 110 in the inserted state. Portions of the holding plate 132 having the projection 133 have the same width as the width W1 of the wide portion 118 of the holding space 115. The other portions of the holding plate 132 without the projection 133 have the same width as the width W2 of the narrow portion 117 of the holding space 115. In the inserted state, the holding plate 132 is closely slid into the associated holding space 115, so that the cleaning element 110 is securely attached to the holding plate 132. Further, in the inserted state, the retaining plate 134 presses the cleaning element 110 from above, and the engagement lug formed on the underside of the retaining plate 134 serves as a stopper for preventing the cleaning element 110 from coming out of the holder. Thus, in the inserted state in which the holding plate 132 is inserted into the holding space 115, the cleaning element 110 is reliably retained by the holder body 130.

Figure 2:
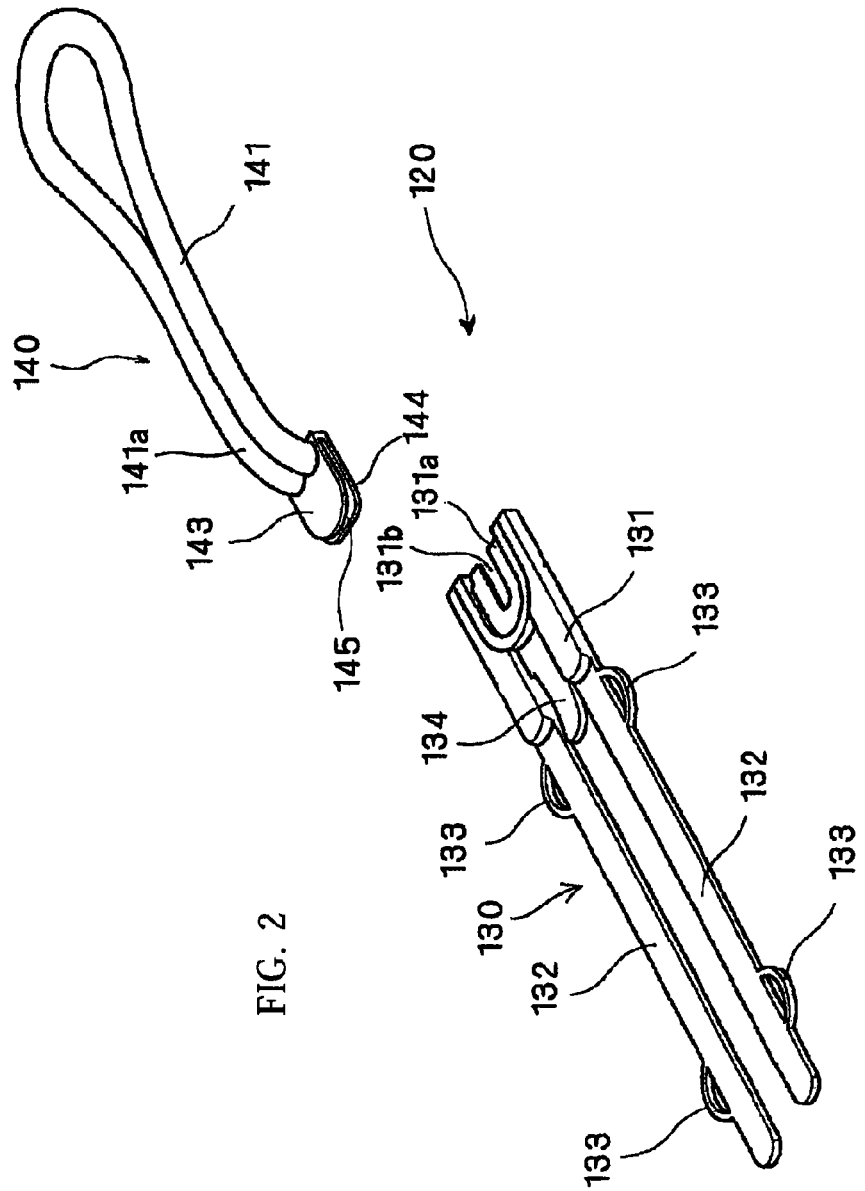
FIG. 2 is a perspective view of the cleaning element holder 120 of FIG. 1 in a disassembled state.

FIG. 2 is a perspective view of the cleaning element holder 120 of FIG. 1 in a disassembled state. As shown, the holder body 130 and the handle 140 are separately resin molded and thereafter disengageably joined together. The holder body 130 has an engagement plate 131a on the rear end of the base 131. The handle 140 has a first engaging plate 143 and a second engaging plate 144 on the front end of the handle body 141. An engagement space 145 is defined between the first engaging plate 143 and the second engaging plate 144 and can receive the engagement plate 131a. A projection (not shown) is provided in the engagement space 145 and can be engaged with a recess 131b of the engagement plate 131a. Thus, when the engagement plate 131a is inserted into the engagement space 145, the engagement plate 131a is sandwiched between the first engaging plate 143 and the second engaging plate 144. Further, the projection of the engagement space 145 is engaged with the recess 131b of the engagement plate 131a. Thus, the holder body 130 and the handle 140 are joined together by a joining force acting therebetween. In this state, the holder body 130 and the handle 140 can be disengaged from each other by pulling the holder body 130 and the handle 140 apart from each other by a pulling force larger than the joining force.

Figure 3:
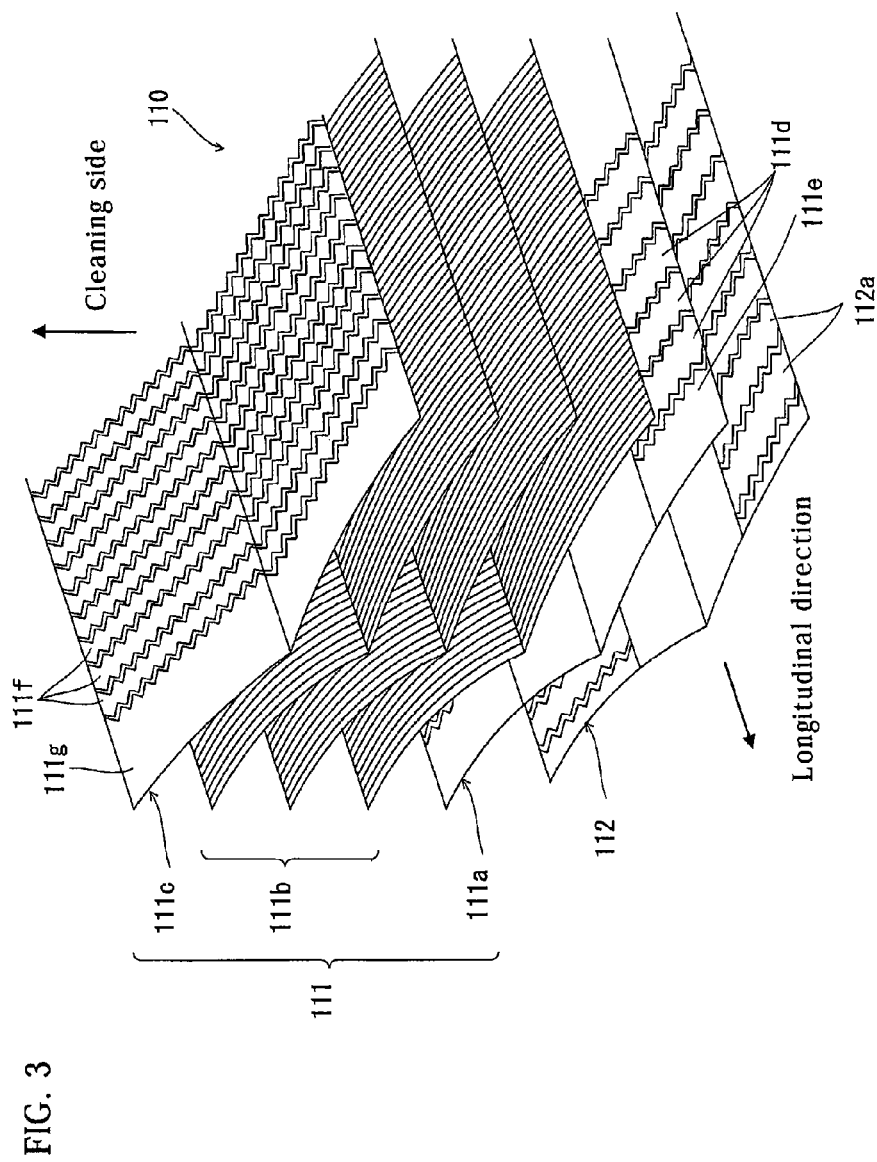
FIG. 3 is a perspective view of the cleaning element 110 of FIG. 1 which is shown separated into component elements.

Referring to FIG. 3, the structure of the cleaning element 110 of this embodiment will be specifically described. FIG. 3 is a perspective view of the cleaning element 110 of FIG. 1 which is shown separated into component elements. As shown, in the cleaning element 110 of this embodiment, the holding sheet 112 is overlaid on the cleaning element body 111 on the cleaning side. Further, the cleaning element body 111 has the cleaning side sheet 111c, the fiber bundle 111b and the base sheet 111a placed one on the other upward from the cleaning side (lower face side) in this order. In this case, the holding sheet 112 and the base sheet 111a are overlaid on the upper face side of the fiber bundle 111b and forms an upper face side sheet. Thus, the fiber bundle 111b is sandwiched between the holding sheet 112 and base sheet 111a (upper face side sheet) and the cleaning side sheet 111c (lower face side sheet). The holding sheet 112, the base sheet 111a and the cleaning side sheet 111c have a plurality of zigzag strips (strip portions) extending in a direction crossing the longitudinal direction of the cleaning element 110. The plurality of the zigzag strips correspond to the "plurality of sheets" according to this invention. Specifically, the holding sheet 112 comprises a plurality of strips 112a arranged in parallel and extending in a direction crossing the longitudinal direction of the cleaning element 110. The base sheet 111a comprises a plurality of strips 111d, 111e arranged in parallel and extending in a direction crossing the longitudinal direction of the cleaning element 110. The cleaning side sheet 111c comprises a plurality of strips 111f, 111g arranged in parallel and extending in a direction crossing the longitudinal direction of the cleaning element 110. An improved structure which can easily trap dust and thus has a higher cleaning function can be realized by the zigzag strips of the sheets. The strips may have the same kind or different kinds of shape appropriately selected among various shapes, such as zigzag, linear and curved shapes.

Figure 4:
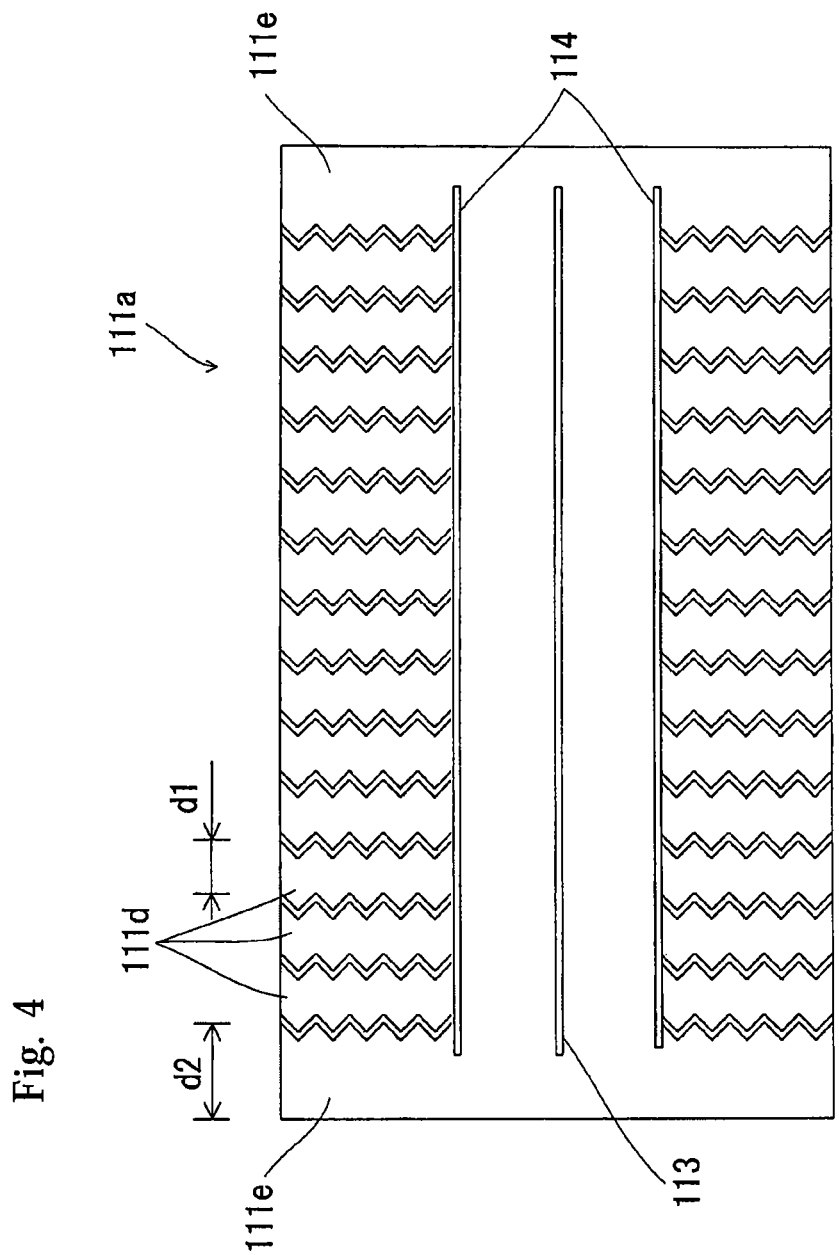
FIG. 4 is a plan view of a base sheet 111a of FIG. 3.

The structure of the strips of the sheets will be more specifically described with reference to FIGS. 4 and 5. FIG. 4 shows the base sheet 111a of FIG. 3, in plan view, and FIG. 5 shows the cleaning side sheet 111c of FIG. 3, in plan view.

As shown in FIG. 4, the strips 111d, 111e of the base sheet 111a extend outward from the side mounting line 114 extending along the longitudinal direction of the cleaning element 110 (the longitudinal direction of the fiber bundle 111b). The strips 111e are arranged on the opposite ends of the extending region of the strips 111d in the longitudinal direction. Therefore, the proximal ends of the strips 111d, 111e are joined at the joining portion of the side mounting line 114. The elongate strips 111d, 111e are fixed only at the proximal ends at the side mounting line 114 and the side (distal ends) opposite to the fixed ends are free. A width d2 of the strips 111e is larger than a width d1 of the strips 111d, more preferably more than twice as large as the width d1. With such structure, the plurality of the strips 111d are protected on the opposite sides by the strips 111e larger (having higher rigidity) than the strips 111d. Thus, the strips 111e on the both sides can perform a protecting function of preventing disorderly positioning and orientation of the plurality of the strips 111d. For example, even if the cleaning element 110 contacts an obstacle, the strips 111d are not easily put into disarray. Here, the base sheet 111a is a sheet overlaid on an upper face of the fiber bundle 111b and is a feature that corresponds to the "upper face side sheet overlaid on an upper face of the fiber bundle" according to this invention.

Figure 5:
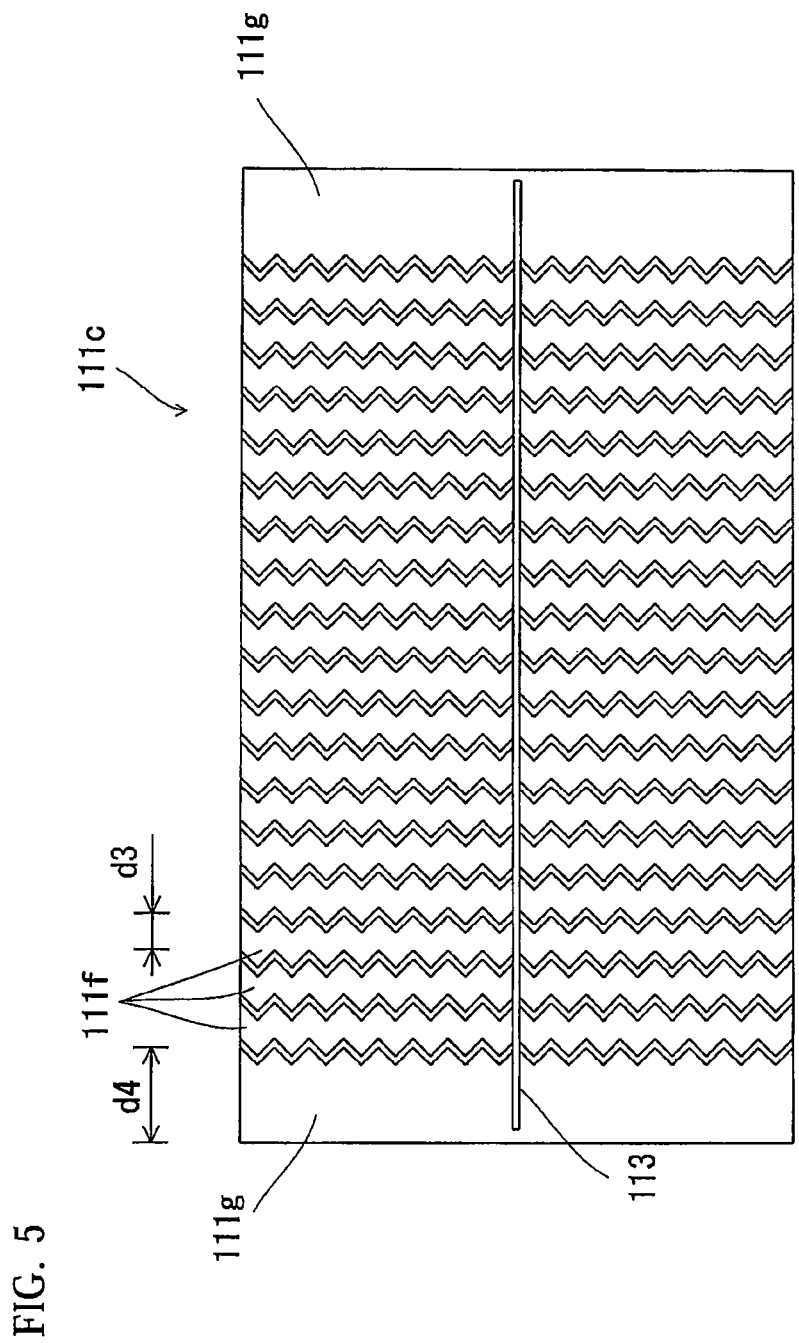
FIG. 5 is a plan view of a cleaning side sheet 111c of FIG. 3.

As shown in FIG. 5, the strips 111f, 111g of the cleaning side sheet 111c extend outward from the central fusion-bonding line 113 extending along the longitudinal direction of the cleaning element 110 (the longitudinal direction of the fiber bundle 111b). The strips 111g are arranged on the opposite ends of the extending region of the strips 111f in the longitudinal direction. Therefore, the proximal ends of the strips 111f, 111g are joined at the proximal ends at the joining portion of the central fusion-bonding line 113. The elongate strips 111f, 111g are fixed only at the proximal ends at the central fusion-bonding line 113 and the sides (distal ends) opposite to the fixed ends are free. A width d4 of the strips 111g is larger than a width d3 of the strips 111f, more preferably more than twice as large as the width d3. With such structure, like the base sheet 111a, the plurality of the strips 111f are protected on the opposite sides by the strips 111g larger (having higher rigidity) than the strips 111f. Thus, the strips 111g on the both sides can perform a protecting function of preventing disorderly positioning and orientation of the plurality of the strips 111f. Here, the cleaning side sheet 111c is a feature that corresponds to the "cleaning side sheet overlaid on a lower face of the fiber bundle" according to this invention.

In the cleaning element 110 in which the cleaning side sheet 111c is joined to the lower face of the fiber bundle 111b, the cleaning side sheet 111c is positioned between the fiber bundle 111b and the face of the object to be cleaned. Therefore, even if the cleaning side sheet 111c has the strips 111f, 111g, the strips may impair the essential dust trapping capability of the fiber bundle 111b.

Therefore, in this embodiment, the width d3 of the strips 111f in the longitudinal direction of the fiber bundle 111b (in the transverse direction in FIG. 5) is smaller than the width d1 of the strips 111d in the longitudinal direction of the fiber bundle 111b (in the transverse direction in FIG. 4). This structure corresponds to the "width of the sheet pieces of the cleaning side sheet being smaller than the width of the sheet pieces of the upper face side sheet in the longitudinal direction" according to this invention. Specifically, the width d1 of the strips 111d of the base side sheet 111a can be 8 to 50 mm, and the width d3 of the strips 111f of the cleaning side sheet 111c can be 4 to 7 mm. In this embodiment, the width of the strips 112a of the holding sheet 112 corresponds to the width d1 of the strips 111d of the base sheet 111a.

With such structure, the strips 111d of the base sheet 111a have relatively high rigidity, while the strips 111f of the cleaning side sheet 111c have relatively low rigidity. The strips 111d having relatively high rigidity has a function of maintaining the wiping function of the cleaning element 110. The strips 111f having relatively low rigidity allow the fiber bundle 111b to be easily exposed from the cleaning side sheet 111c to the cleaning side. Thus, the surface exposed area of the fiber bundle 111b is increased, and the dust trapping capability of the fiber bundle 111b can be enhanced. Therefore, the cleaning effect can be enhanced without impairing the essential dust trapping capability. In order to make the rigidity of the strips 111f of the cleaning side sheet 111c lower than that of the strips 111d of the base side sheet 111a, it is preferred to provide at least one of the following two structures: the structure in which the width of the strips 111f of the cleaning side sheet 111c is made smaller than that of the strips 111d of the base side sheet 111a, and the structure in which the thickness of the strips 111f of the cleaning side sheet 111c is made thinner than that of the strips 111d of the base side sheet 111a.

Figure 6:
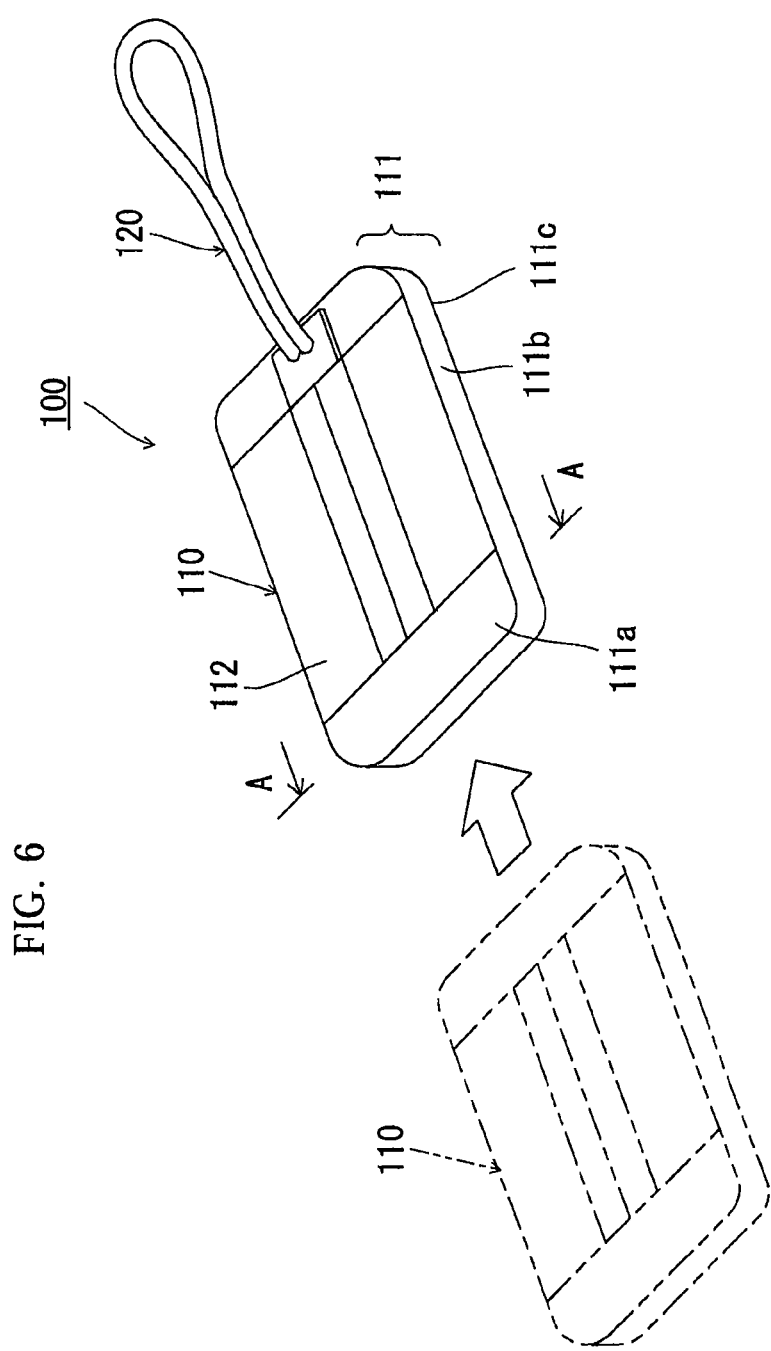
FIG. 6 schematically shows the manner of mounting the cleaning element 110 onto the cleaning element holder 120 in this embodiment.
Figure 7:
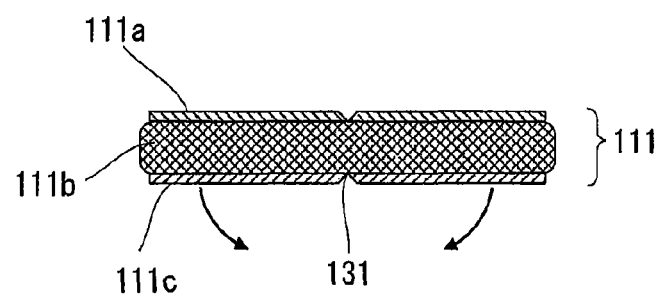
FIG. 7 is a sectional view taken along line A-A in FIG. 6.
Figure 8:
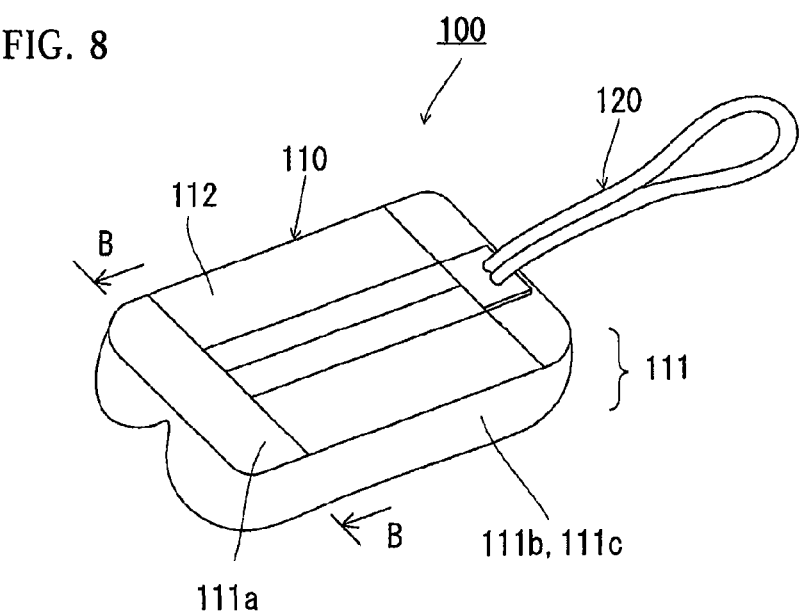
FIG. 8 schematically shows the cleaning tool 100 of this embodiment which is ready for use.
Figures 9, 10:
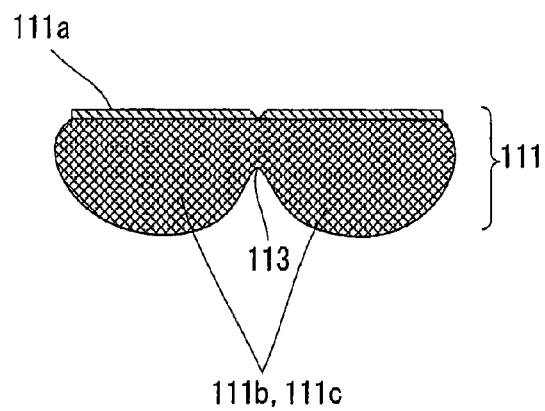
FIG. 9 is a sectional view taken along line B-B in FIG. 8.
FIG. 10 is a table showing the results of bending resistance measurement made on each test sample by a 45° cantilever method.

Usage of the cleaning tool 100 having the above-described construction will now be described with reference to FIGS. 6 to 9. FIG. 6 schematically shows the manner of mounting the cleaning element 110 onto the cleaning element holder 120 in this embodiment. FIG. 7 is a sectional view taken along line A-A in FIG. 6. FIG. 8 schematically shows the cleaning tool 100 of this embodiment which is ready for use. FIG. 9 is a sectional view taken along line B-B in FIG. 8.

In order to use the cleaning tool 100, as shown in FIG. 6, the cleaning element 110 is mounted onto the cleaning element holder 120. In this mounted state, the thickness of the cleaning element 110 in the sectional direction is minimized. Further, the cleaning side sheet 111c facing the face to be cleaned is held separated from the fiber bundle 111b, so that it cannot perform a desired cleaning function. In order to obtain a desired cleaning function, preferably, the cleaning element 110 is lightly shaken or broken up into pieces directly by hand, or lightly shaken with the cleaning element holder 120 held by hand, such that air is taken into the fiber bundle 111b and the fiber bundle 111b expands three-dimensionally. As a result, the fibers of the fiber bundle 111b are mixed with the strips 111f of the cleaning side sheet 111c. Upon swinging movement of the strips 111f about the fixed ends or the central fusion-bonding line 113, the outer free ends of the strips 111f depend downward (in the direction shown by the arrows in FIG. 7) under the own weight. At this time, the fibers of the fiber bundle 111b depend downward around the joining portion of the central fusion-bonding line 113 together with the strips 111f of the cleaning side sheet 111c. Thus, containing air in the fiber bundle 111b, the cleaning element 110 is made bulkier than before the holder 120 is mounted. Specifically, in synchronization with the swinging movement of the strips 111f of the cleaning side sheet 111c, the cleaning element 110 expands by containing air between the fibers of the fiber bundle 111b. Particularly, in this embodiment, the strips 111f of the cleaning side sheet 111c have a relatively smaller width than the strips 111d of the base sheet 111a. Therefore, the volume of the fiber bundle 111b can be increased without causing a problem that the strips 111f impair elasticity of the fiber bundle 111b. Thus, the users can gain higher expectations and peace of mind with respect to the dust trapping function. Further, by forming the fiber bundle 111b by using crimped fibers as mentioned above, the fibers of the fiber bundle 111b can be easily entangled with the strips 111f of the cleaning side sheet 111c.

Thus, as shown in FIGS. 8 and 9, the fibers of the fiber bundle 111b are mixed with the strips 111f of the cleaning side sheet 111c, and the fiber bundle 111b expands three-dimensionally. By expansion of the cleaning element 110, the elasticity of the cleaning element 110 is increased, so that the cleaning element 110 can easily conform to (or make close contact with) irregular or curved surfaces of the object to be cleaned. At this time, the fibers of the fiber bundle 111b perform a cleaning function in mixture with the strips 111f of the cleaning side sheet 111c in cooperation with the strips 111f. Particularly, the fiber bundle 111b serves as a core of a dirt collecting function as dirt is entangled between the fibers of the fiber bundle 111b or on the crimped portions of the fibers. Further, the fiber bundle 111b is exposed downward from the strips 111f and thus appears to be increased in volume, which can provide the users with higher expectations and peace of mind with respect to the dust trapping function. The strips 111f have a dirt collecting function in addition to the fiber bundle 111b serving as a core of the dust collecting function. The strips 111f can easily reach into finer irregularities or curved surfaces of the object to be cleaned and retain the dust between the strips or on the strip faces, thus performing a cleaning function. The strips 111d, 111e of the base sheet 111a and the strips 112a of the holding sheet 112 are not easily affected by the movement of the fiber bundle 111b and perform a dust wiping-out function independently of the movement of the fiber bundle 111b.

Further, inventors have evaluated the rigidity and various properties of the cleaning element 110 having the above-mentioned structure and studied on the optimum construction of the cleaning element 110 for performing a desired cleaning function. Specifically, the cleaning function of the cleaning element 110 can be made clear by evaluation of the rigidity of the strips 111f of the cleaning side sheet 111c, tight-space conformability of the strips 111f and the fiber bundle 111b, the volume of the cleaning element 110, productivity of the strips 111f, irregular-face dust collecting capability of the cleaning element 110.

As for measurement of the rigidity of the strips 111f, a through-air bonded nonwoven fabric formed of conjugated fibers of polyethylene terephthalate (PET) and polypropylene (PP) and having a basis weight of 30 g/m$^2$ was used. The nonwoven fabric was worked into strips and used as test samples for rigidity measurement. The strips were formed into a 90° zigzag shape having a length of 150 mm. The strips had a thickness of 0.43 mm and different widths of 3 mm, 4 mm, 5 mm, 7 mm and 10 mm. FIG. 10 shows the results of measurement which was made on each test sample by a 45° cantilever method to which a JIS-defined method was applied. In the cantilever method, as an index to evaluate the rigidity (flexibility) of the object to be evaluated, the degree of resistance against the bending deformation of the object to be evaluated is expressed as bending resistance in terms of length. At this time, the rigidity is evaluated as being low when the value of the bending resistance is relatively low (short), while it is evaluated as being high when the value of the bending resistance is relatively high (long). Here, in order to measure the bending resistance by the 45° cantilever method, a shorter side of each test sample (specimen) was aligned parallel to the edge end of the 45° cantilever testing device, and the test sample was slid in the longitudinal direction while being lightly pressed with a wood scale. Then, when the test sample bent under its own weight, the length of the bent portion was measured. This length was defined as the bending resistance. Further, the bending resistance was measured on the front and back sides of each test sample, and the average value was defined as the bending resistance of the test sample.

As shown in FIG. 10, the measured bending resistances of the strips having widths of 4 mm, 5 mm and 7 mm were 68 mm, 70 mm and 72 mm, respectively, all of which can be evaluated as being within a desired range of the rigidity required of the strips 111f of this embodiment. Strips 111f having a larger width and thus too high rigidity will collapse the air gap between the fibers of the fiber bundle 111b, so that the fiber bundle 111b cannot be easily increased in volume. Further, such strips 111f will interfere with free movement of the fiber bundle 111b, so that the fiber bundle 111b cannot easily reach into irregularities or tight space of the object to be cleaned. Thus, the fiber bundle 111b enjoying a key part of the dust trapping function cannot be effectively utilized. Further, the strips 111f will not be easily entangled with the fiber bundle 111b and thus cannot easily reach into irregularities or tight space of the object to be cleaned. Thus, the dust trapping function of the strips 111f themselves will be impaired. On the contrary, strips 111f having a smaller width and thus too low rigidity will be excessively entangled with the fiber bundle 111b, so that the fiber bundle 111b is easily massed and impaired in appearance. Typically, the strips 111f are preferred to have a width of 4 to 7 mm and a bending resistance of 68 to 72 mm as measured by the 45° cantilever method.

As for measurement of the tight-space conformability of the strips 111f, a through-air bonded nonwoven fabric formed of conjugated fibers of polyethylene terephthalate (PET) and polypropylene (PP) and having a basis weight of 30 g/m$^2$ was used. The nonwoven fabric was worked into strips and then fusion bonded to the fiber bundle to thereby obtain a cleaning element as a test sample. The strips were formed into a 90° zigzag shape having a length of 60 mm. The strips had a thickness of 0.43 mm and different widths (lengths of the shorter sides) of 3 mm, 4 mm, 5 mm, 7 mm and 10 mm, which widths correspond to the width d3 in FIG. 5. The test samples are not only used in the measurement of tight-space conformability of the strips 111f, but in evaluations of tight-space conformability of the fiber bundle 111, the volume of the cleaning element 111, productivity of the strips 111f, and irregular-face dust collecting capability of the cleaning element 110.

In order to measure the tight-space conformability of the strips 111f, each test sample was attached to a cleaning element holder and lightly shaken by hand so as to contain air. The test sample was worked on the face of a polyethylene-coated net (about 300 mm square with a 25-mm mesh) to thereby create an artificial cleaning state. Specifically, each test sample attached to the cleaning element holder was moved to and fro on the net face along the extending direction of the net face five times in constant stroke (of 200 mm). Thereafter, a weight of about 20 g is placed on the cleaning element holder in a still standing state. At this time, the tight-space conformity of the strips 111f were evaluated by the number of strips protruding through the net. The tight-space conformability of the strips 111f is evaluated as being high when the number of strips protruding through the net is relatively large, while it is evaluated as being low when the number of strips protruding through the net is relatively small. FIG. 11 shows the results of measurements of tight-space conformability of the strips of each test sample.

As shown in FIG. 11, the measured tight-space conformabilities of the strips having widths of 4 mm, 5 mm and 7 mm were 34 strips, 33 strips and 27 strips, respectively. All of these strips have higher tight-space conformability than the strips having a width of 10 mm and the tight-space conformability of 18 strips and can be evaluated as being within a desired range of the tight-space conformability required of the strips 111f of this embodiment. The tight-space conformability can be enhanced by forming the strips having a width of 4 to 7 mm. As a result, the strips can easily reach into irregularities or tight space of the object to be cleaned and the dust trapping function of the strips themselves can be prevented from being impaired.

In measurement of tight-space conformability of the fiber bundle 111, each test sample was attached to a cleaning element holder, lightly shaken by hand so as to contain air, and held still with the face to be cleaned on the upside. Then, a polyethylene-coated net (about 300 mm square with a 25-mm mesh) was placed on the test sample, and the test sample was moved to and fro on the face to be cleaned through the net five times in constant stroke (of 200 mm). Thus, an artificial cleaning state was created. Thereafter, the test sample was tested whether it is lifted when the net is lifted. The fiber bundle was judged as having the tight-space conformability when the test sample was lifted. The tight-space conformability of the fiber bundle was evaluated in terms of the percentage of the number of times it was judged as having the tight-space conformability in ten measurements. FIG. 11 shows the results of measurements of tight-space conformability of the fiber bundle of each test sample.

As shown in FIG. 11, the measured tight-space conformabilities of the fiber bundle were 100%, 100% and 80% when the strips have widths of 4 mm, 5 mm and 7 mm, respectively. In any of these cases, the fiber bundle has higher tight-space conformability than the tight-space conformability of 50% obtained when the strips have a width of 10 mm and can be evaluated as being within a desired range of the tight-space conformability required of the fiber bundle 111b of this embodiment. The tight-space conformability can be enhanced by using the strips having a width of 4 to 7 mm. As a result, the fiber bundle can easily reach into irregularities or tight space of the object to be cleaned and the dust trapping function of the fiber bundle can be prevented from being impaired.

Next, in evaluation of the volume of the cleaning element 110, each test sample was lightly shaken by hand so as to contain air, and the volume of the test sample was evaluated by appearance by monitoring. The test samples were compared in volume with each other and rated as "⊚" when excellent (having a high voluminous feeling), "○" when fair (having a moderate voluminous feeling) and "Δ" when not so good (having a low voluminous feeling). FIG. 11 shows the results of evaluation of the volume of the cleaning element of each test sample.

As shown in FIG. 11, the evaluations of the volume of the cleaning element were "⊚" when the strips have a width of 4 mm or 5 mm and "○" when the strips have a width of 7 mm. In any of these cases, the cleaning element can be evaluated as being within a desired range of the volume required of the cleaning element 110 of this embodiment. On the contrary, when the strips have a width of 10 mm, the strips are not easily caught on the fiber bundle and have a low volume increasing effect. Further, when the strips have a width of 3 mm, the strips are entangled with each other, so that they are not easily caught on the fiber bundle and have a low volume increasing effect. Therefore, by using the strips having a width of 4 to 7 mm, the strips are easily caught on the fiber bundle and prevented from being entangled with each other, so that a higher volume increasing effect can be obtained.

Next, in evaluation of the productivity of the strips 111f, the degrees of difficulty in forming the strips with manufacturing apparatuses were evaluated. The productivities of the strips 111f were rated as "○" when the degree of difficulty in production is low by use of a manufacturing apparatus having a relatively large spacing between cutter blades, and as "x" when the degree of difficulty in production is high by use of a manufacturing apparatus having a relatively small spacing between cutter blades. FIG. 11 shows the results of evaluation of the productivity of the strips.

As shown in FIG. 11, the strips having a width of 4 mm, 5 mm, 7 mm or 10 mm were rated as "○" in evaluation of the productivity and evaluated as having a low degree of difficulty in production. When the strips have a width of 3 mm, the strips were rated as "x" in evaluation of the productivity and evaluated as having a high degree of difficulty in production.

In evaluation of the irregular-face dust collecting capability of the cleaning element 110, an artificial dusty surface is prepared by spraying about 20 mg of type XII dust (fine grain of Kanto loam layer) for JIS (Japanese Industrial Standards) tests on the polyethylene corrugated plate tray (300 mm square). Each test sample was attached to a cleaning element holder and lightly shaken by hand so as to contain air. The test sample was then worked on the face of the artificial dusty surface to thereby create an artificial cleaning state. Specifically, each test sample attached to the cleaning element holder was moved to and fro on the artificial dusty surface five times in constant stroke (of 200 mm). At this time, the dust collecting capability was visually evaluated. In this evaluation, the test samples were rated as "⊚" when excellent (having a high dust collecting capability), "○" when fair (having a moderate dust collecting capability) and "x" when poor (having a low dust collecting capability). FIG. 11 shows the results of evaluation of the irregular-face dust collecting capability of the cleaning element of each test sample.

As shown in FIG. 11, the strips having a width of 4 mm, 5 mm or 7 mm were rated as "⊚" in evaluation of the dust collecting capability and evaluated as having an excellent dust collecting capability. When the strips have a width of 3 mm or 10 mm, the strips were rated as "○" and evaluated as having a lower dust collecting capability than those having a width of 4 mm, 5 mm or 7 mm. The strips having a width of 3 mm are entangled with each other and prevent the fiber bundle from being exposed outside, and the strips having a width of 10 mm and thus having a large area also prevent the fiber bundle from being exposed outside.

As described above, based on the results of evaluation as shown in FIGS. 10 and 11, inventors have studied effective structures in which the cleaning element 110 can perform an optimum cleaning function. As a result, it was found preferable that the strips 111f of the cleaning side sheet 111c have a thickness of 0.43 mm, a width of 4 to 7 mm and a bending resistance of 68 to 72 mm as measured by the 45° cantilever method. With such construction, the cleaning element 110 can obtain a higher cleaning function by optimizing the width of the strips 111f of the cleaning side sheet 111c.

The present invention is not limited to the embodiment as described above, but rather, may be added to, changed, replaced with alternatives or otherwise modified. For example, the following provisions can be made in application of this embodiment.

In the above-described embodiment, the optimum conditions for the cleaning element 110 to perform a desired cleaning function have been described as being that the strips 111f of the cleaning side sheet 111c have a width of 4 to 7 mm and a bending resistance of 68 to 72 mm as measured by the 45° cantilever method. However, in this invention, it is essential for the strips 111f of the cleaning side sheet 111c only to have a smaller width or lower bending resistance than the strips 111d of the base sheet 111a, and the width and the bending resistance of the strips 111f can be appropriately selected as necessary.

Further, in this invention, the object to be compared for defining the width and the bending resistance of the strips 111*f* of the cleaning side sheet 111*c* is not limited to the strips 111*d* of the base sheet 111*a*, but the sheet pieces (strips) of the sheet overlaid on the upper face of the fiber bundle 111*b* can be appropriately selected as the object to be compared. As an alternative or in addition to the strips 111*d* of the base sheet 111*a*, the strips 112*a* of the holding sheet 112 may be selected as the object to be compared. Specifically, in this invention, when a plurality of upper face side sheets having sheet pieces (strips) are overlaid on the fiber bundle, at least one of the upper face side sheets can be selected as the object to be compared for defining the width and the bending resistance of the strips of the cleaning side sheet. Further, in this invention, when a single upper face side sheet having sheet pieces (strips) are overlaid on the fiber bundle, the single upper face side sheet can be used as the object to be compared for defining the width and the bending resistance of the strips of the cleaning side sheet.

DESCRIPTION OF NUMERALS 100 cleaning tool
110 cleaning element
111 cleaning element body
111*a* base sheet
111*b* fiber bundle
111*c* cleaning side sheet
111*d*, 111*e*, 111*f*, 111*g* strip
112 holding sheet
112*a* strip
113 central fusion-bonding line
114 side mounting line
115 holding space
120 cleaning element holder
130 holder body
140 handle
141 handle body
141*a* joint

What we claim is:

1. A cleaning element, comprising:
   a fiber bundle comprising a plurality of fibers and extending in a predetermined longitudinal direction,
   an upper face side sheet overlaid on an upper face of the fiber bundle, and
   a cleaning side sheet overlaid on a lower face of the fiber bundle which cleaning side sheet comprises an uppermost sheet that faces an object to be cleaned, wherein:
   the upper face sheet and the cleaning side sheet are formed of sheet-like nonwoven fabric and joined together in a laminated state on the fiber bundle at a joining portion that extends in said longitudinal direction, both of the upper face side sheet and the cleaning side sheet are formed with a plurality of strips extending parallel in a direction crossing said longitudinal direction,
   the strips of the cleaning side sheet and the fibers of the fiber bundle extend elongate in the direction crossing said longitudinal direction, having fixed ends only at said joining portion and free ends on sides opposite to the joining portion,
   the strips of the cleaning side sheet have a smaller width in said longitudinal direction that the strips of the upper face side sheet,
   the strips of the cleaning side sheet have a bending resistance of 68-72 mm as measured by a 45° cantilever method, and
   wherein the fiber bindle is attached to the cleaning side sheet exclusively along a line that extends along the centers of the fiber bundle and the cleaning side sheet in the longitudinal direction and the fiber bundle is provided with crimped fibers so that free ends of the crimped fibers can be readily entangled with the strips of the cleaning side sheet and cause the fiber bundle to increase in bulk and cause swing together with the strips around the joining portion toward the object to be cleaned.

2. The cleaning element as defined in claim 1, wherein the strips of the cleaning side sheet have a width of 4 to 7 mm in said longitudinal direction.

3. The cleaning element as defined in claim 1, wherein the strips of the cleaning side sheet have lower rigidity than the strips of the upper face side sheet.

4. A cleaning tool comprising:
   the cleaning element as defined in claim 1, and
   a holder having a grip to be held by a user in a cleaning operation and a holding portion for holding the cleaning element, the grip and the holding portion being coupled to each other.

5. The cleaning tool as defined in claim 4, wherein the fibers of the fiber bundle depend downward around the joining portion together with the sheet pieces of the cleaning side sheet, whereby the fiber bundle becomes bulkier that before the holder is mounted.

* * * * *